Sept. 25, 1956　　　　　A. MASON　　　　　2,764,702
VELOCITY TRANSDUCER
Filed March 19, 1953　　　　　　　　　　　　2 Sheets-Sheet 1
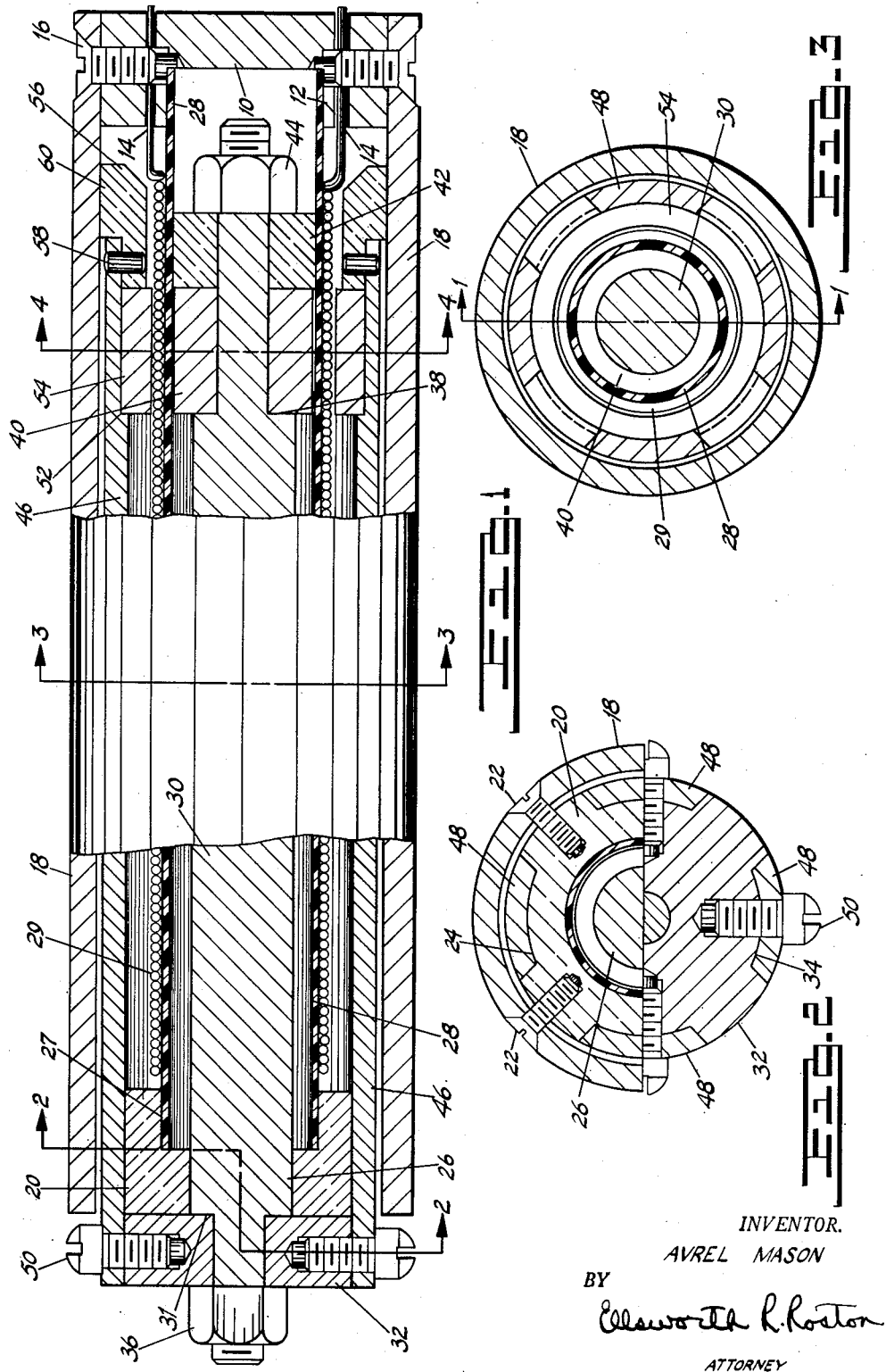
INVENTOR.
AVREL MASON
BY
Ellsworth R. Roston
ATTORNEY Sept. 25, 1956      A. MASON      2,764,702
VELOCITY TRANSDUCER
Filed March 19, 1953      2 Sheets-Sheet 2
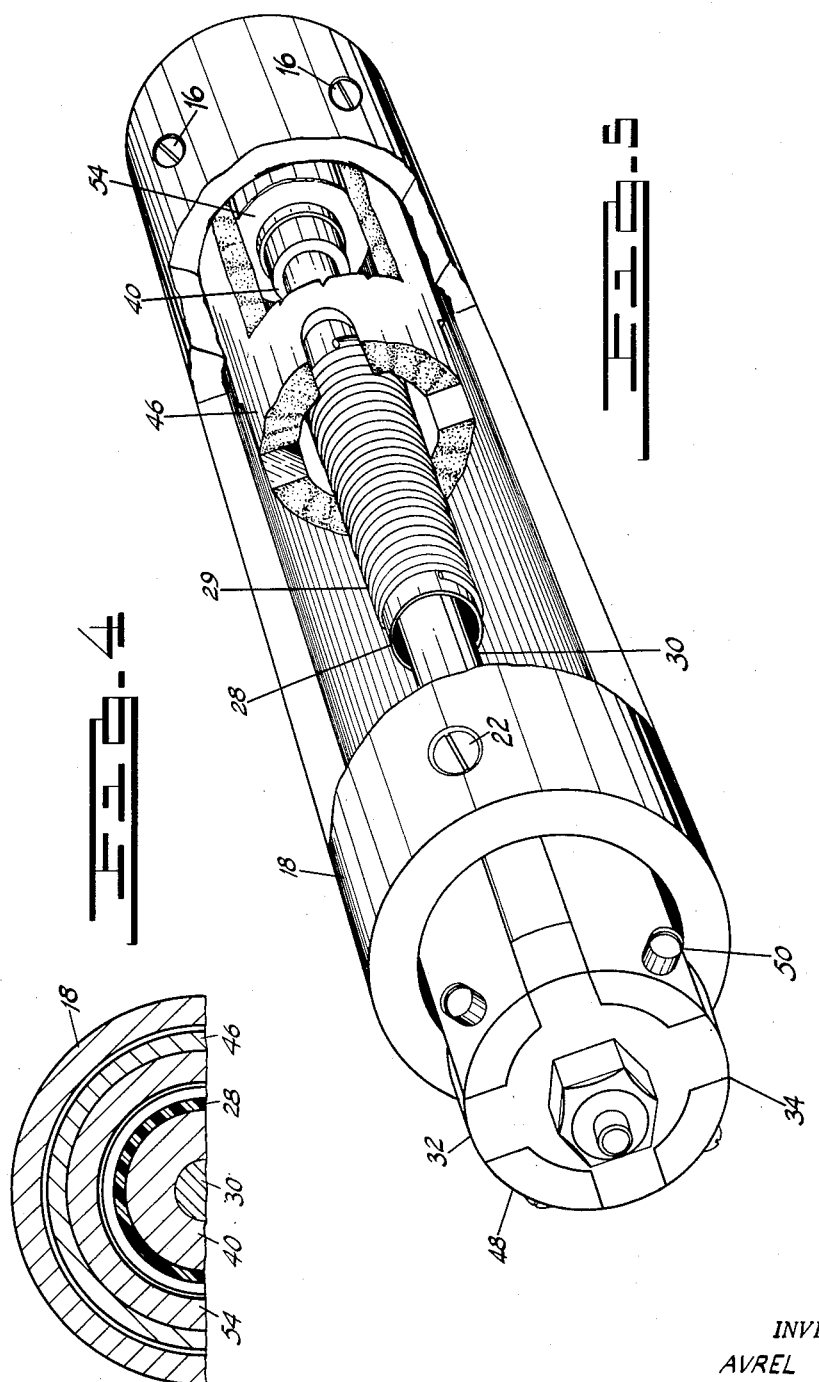
INVENTOR.
AVREL MASON
BY
Ellsworth R. Roston
ATTORNEY United States Patent Office 2,764,702
Patented Sept. 25, 1956

2,764,702

VELOCITY TRANSDUCER

Avrel Mason, Birmingham, Mich., assignor to Bendix Aviation Corporation, Detroit, Mich., a corporation of Delaware Application March 19, 1953, Serial No. 343,443

1 Claim. (Cl. 310—15)

This invention relates to apparatus for measuring velocity and more particularly to apparatus for measuring the linear velocity of a moving object.

Often it is necessary to measure the linear velocity of various moving parts in machinery such as sliding ways, cutter heads, etc. There are in present use various A.-C. and D.-C. tachometers for indicating the linear velocity of a moving object. Most of these tachometers are of the rotary type and employ a rack and pinion gear to translate linear motion to rotary motion. Because of the tolerances that necessarily exist in any gear meshing mechainsm, such tachometers are not as accurate as may be desired for some purposes. Furthermore, dynamic vibrations are set up by the rack and pinion gear during their operation and over a period of time, the vibrations are instrumental in further affecting the accuracy of such tachometers and in shortening their useful life. Another disadvantage of rotary tachometers is that they usually employ moving electrical components such as commutators, brushes, slip rings, etc. which wear out periodically and cause undesirable electrical noises during their operation. A further disadvantage of many rotary tachometers is that they require external A.-C. excitation.

This invention provides a simple, compact, and reliable apparatus for indicating the instantaneous velocity of a moving object. The invention does not employ rotary mechanical components or moving electrical components and does not require external excitation. The invention includes inner and outer members which are movable as a unit in an axial direction relative to a coil positioned between them. The members are magnetized in a direction to produce a magnetic flux which extends in a radial direction through the coil. The magnetic flux provided in the inner and outer members is of sufficient intensity to saturate the members so that hysteresis and eddy current effects are minimized as the members move relative to the coil. Because of the magnetic flux, the coil has induced in it a voltage indicative of the rate of movement of the members as the members move in an axial direction relative to the coil.

An object of this invention is to provide apparatus for operating in a reliable manner to indicate accurately the rate at which a member moves.

Another object of this invention is to provide apparatus of the above character for giving instantaneous indications of the velocity of a member at any given position along its path of movement.

A further object is to provide apparatus of the above character for producing a magnetic flux in a radial direction relative to a coil and for producing an axial movement of the flux relative to the coil to induce in the coil a voltage indicative of the rate of flux movement.

Still another object is to provide apparatus of the above character for operating with a magnetically saturated flux path to eliminate the production of independent currents in the flux path which would impair the linear characteristics of the apparatus.

A still further object is to provide apparatus of the above character for insuring long life and trouble-free operation by the elimination of rotating mechanical components such as gears and by the further elimination of movable electrical components such as commutators, brushes, slip rings, etc.

Other objects and advantages will be apparent from a detailed description of the invention and from the appended drawings and claim.

In the drawings:

Figure 1 is a sectional view, partly broken away, and is taken substantially on the line 1—1 of Figure 3;

Figure 2 is a sectional view taken substantially on the line 2—2 of Figure 1;

Figure 3 is a sectional view taken substantially on the line 3—3 of Figure 1;

Figure 4 is a sectional view taken substantially on the line 4—4 of Figure 1, the lower half being broken away since it is identical to the upper half; and Figure 5 is a perspective view of the apparatus shown in one of its operative positions as the inner unit moves outward relative to the housing, some of the components being broken away to show other components more clearly.

In one embodiment of the invention, a disc 10 is provided with a socket 12 and axial holes 14. The disc 10 is secured as by screws 16 to the right end of an annular housing 18. The disc 10 and the housing 18 are made from a non-magnetic material such as brass for reasons which will be disclosed hereinafter.

At the left end of the housing, a bearing 20 made from a suitable non-magnetic material such as oilite bronze is secured as by screws 22 (Figure 2) to the housing 18. The bearing 20 is provided with a plurality of spaced axial grooves 24 (Figure 2) on its periphery and with a centrally disposed hole 26. The bearing 20 is also provided with a socket 27 at its right end.

A non-magnetic tube 28 is axially disposed within the housing 18. The opposite ends of the tube 28 are retained within the sockets 12 and 27 provided in disc 10 and bearing 20, respectively. A plurality of turns of wire are wound on the tube 28 to form a coil 29. The turns of wire extend from a position adjacent the disc 10 to a position adjacent the bearing 20. The leads of the coil 29 extend through the holes 14 in the disc 10 to a position on the exterior side of the disc so as to provide connections to other components in a measuring circuit (not shown).

A shaft 30 made of a material having magnetic properties such as Armco iron is axially disposed within the tube 28 so as to extend through the hole 26 in the bearing 20 in slidable relationship to the bearing. The shaft 30 is provided at its left end with a shoulder portion 31 which positions an annular collar 32 made from a magnetic material and having a plurality of spaced axial grooves 34 (Figure 2) on its periphery for alignment with the grooves 24 in the bearing 20. The collar 32 is fixedly positioned against the shoulder portion 31 by a nut 36 which screws on a threaded portion at the left end of the shaft 30.

Provided at the right end of the shaft 30 is another shoulder portion 38 for positioning an annular pole piece 40 made of a suitable magnetic material such as Alnico so as to remain permanently magnetized. The pole piece 40 is fixedly positioned against the shoulder 38 by an annular bearing 42 and a nut 44 which screws tightly against the bearing 42 on a threaded portion at the right end of the shaft 30.

A sleeve 46 also made of a magnetic material is positioned between the housing 18 and the tube 28. The left portion of the sleeve 46 is provided with a plurality of slots to form prongs 48 which extend through the grooves 24 in the bearing 20 in slidable relationship with the bearing. The ends of the prongs 48 are set into the grooves 34 provided on the collar 32 and are attached to the collar 32 as by screws 50.

The right end of the sleeve 46 is provided with a shoulder portion 52 to position an annular pole piece 54 also made of a suitable magnetic material such as Alnico so as to remain permanently magnetized. An annular bearing 56 made from a non-magnetic material is secured as by pins 58 to the right end of the sleeve. The bearing 56 presses against the pole piece 54 to maintain the pole piece in a fixed position against the shoulder 52. A flange portion 60 provided on the bearing 56 is adapted to slide on the inner surface of the housing 18. The flange 60 is provided with a slightly larger diameter than the sleeve 46 for maintaining a spaced relationship between the sleeve 46 and the housing 18 as the sleeve moves axially within the housing.

The pole pieces 40 and 54 provide a magnetic flux which extends radially through the coil 29 positioned between the pole pieces. Since the sleeve 46, the collar 32 and the shaft 30 are the only other components having magnetic properties, they define a complete path for the passage of the flux. Because of the intensity of the flux and the dimensions of the shaft 30, the flux is of sufficient intensity to saturate the flux path through shaft 30.

Upon application of a pulling force to the left end of the shaft 30 in the above apparatus, the shaft 30, the collar 32, the sleeve 46 and the pole pieces 40 and 54 move outwardly as a unit relative to the housing 18 and the coil 29. As a result, the magnetic flux extending radially through the gap between the pole pieces cuts across the windings of the coil 29 to produce in the coil a voltage having an amplitude substantially proportional to the rate of movement of the flux relative to the coil. Similarly, an opposite voltage is induced in the coil 29 when the pole pieces 40 and 54 move inwardly into the housing 18.

In this way, the linear velocity of a moving object can be measured by connecting the object to the left end of the shaft 30 while the housing 18 is supported in a stationary position. The instantaneous voltage produced in the coil at any given position of the moving object can be measured on an oscilloscope calibrated to give velocity readings. If an average velocity reading is desired, a calibrated voltmeter will provide such a reading.

This invention is particularly advantageous in that the magnetic flux provided by the pole pieces 40 and 54 extends through all the windings in the coil in the same radial direction. Therefore as the flux moves axially relative to the coil in any one direction, the voltages induced in the various windings affected are always disposed in the same direction and are thus cumulative. For this reason there is no need for providing a commutator to switch opposing voltages as is normally required in D.-C. devices such as a D.-C. generator. The elimination of a commutator means is instrumental in producing a long life and trouble-free operation for the above apparatus since a commutator includes sliding electrical components which wear out periodically and produce electrical noises during their operation. Also, since the length of coil cutting the magnetic flux is always constant, no output ripple can be produced as is the case of common D.-C. machinery possessing a limited number of commutator bars.

The invention has the further advantage of having no rotating mechanical components such as gears which, as previously disclosed, produce inaccuracies and set up dynamic vibrations that are instrumental in affecting the accuracy and life of rotary tachometers. Another important feature of the above apparatus is that the flux path in the shaft 30 is saturated at all times to minimize the production of hysteresis and eddy current effects which would otherwise impair the linear characteristics of the apparatus.

Although the apparatus disclosed is particularly adapted to measure the linear velocity of a moving object, various other uses will become apparent to persons skilled in the art. For example, the apparatus can be utilized to provide a voltage having a desired wave form. This can be accomplished by attaching an object to the apparatus which is adapted to move so as to induce in the coil a voltage having the desired wave form.

Although this invention has been disclosed and illustrated with reference to particular applications, the principles involved are susceptible of numerous other applications which will be apparent to persons skilled in the art. The invention is therefore, to be limited only as indicated by the scope of the appended claim.

What is claimed is:

In combination, a shaft, a sleeve surrounding the shaft and movable with the shaft, a first magnet of annular configuration mounted on the shaft, a second magnet of annular configuration mounted on the sleeve in direct alignment with the first magnet to provide a magnetic flux between the first and second magnets in a radial direction relative to the shaft and sleeve, the magnetic flux being of sufficient intensity to saturate the shaft, a coil fixedly positioned between the first and second magnets, and means for moving the shaft and sleeve at a particular rate in an axial direction relative to the coil to move the magnetic flux across the windings of the coil to produce in the coil a voltage substantially proportional to the rate of movement of the shaft and sleeve.

References Cited in the file of this patent

UNITED STATES PATENTS

| | | |
|---|---|---|
| 2,348,225 | Petty | May 9, 1944 |
| 2,387,223 | Carson | Oct. 16, 1945 |
| 2,424,724 | Tolk | July 29, 1947 |
| 2,582,769 | Congdon | Jan. 15, 1952 |
| 2,596,048 | Severs | May 6, 1952 |

FOREIGN PATENTS

| | | |
|---|---|---|
| 733,043 | France | June 28, 1932 |